United States Patent [19]

Haferl

[11] Patent Number: 4,866,353
[45] Date of Patent: Sep. 12, 1989

[54] ARRANGEMENT FOR REDUCING RINGING IN A FLYBACK TRANSFORMER

[75] Inventor: Peter E. Haferl, Adliswil, Switzerland

[73] Assignee: RCA Licensing Corporation, Princeton, N.J.

[21] Appl. No.: 238,631

[22] Filed: Aug. 31, 1988

[30] Foreign Application Priority Data

Mar. 25, 1988 [GB] United Kingdom ............... 8807209

[51] Int. Cl.[4] .............................................. H01J 29/70
[52] U.S. Cl. ................................. 315/411; 358/190; 363/21
[58] Field of Search .................... 315/411; 358/190; 363/21

[56] References Cited

U.S. PATENT DOCUMENTS 4,213,166  7/1980  Watanabe ........................... 358/190
4,823,248  4/1989  Ikeuchi et al. ...................... 815/411

Primary Examiner—Theodore M. Blum
Attorney, Agent, or Firm—Joseph S. Tripoli; Joseph J. Laks; Sammy S. Henig

[57] ABSTRACT

A diode is coupled to a low voltage end terminal of a tertiary high voltage winding of a horizontal flyback transformer. The diode is back biased during trace and during a portion of the second half of retrace by a voltage that is coupled to the diode through a resistor from a B+ voltage source. When the diode is back biased, the resistor dampens parasitic ringing current in the tertiary winding caused by the leakage inductance of the transformer. During a portion of retrace, occuring prior to the time the diode is back biased, the diode is conductive and bypasses the resistor. This prevents the resistor from increasing the output impedance at the ultor terminal.

16 Claims, 3 Drawing Sheets

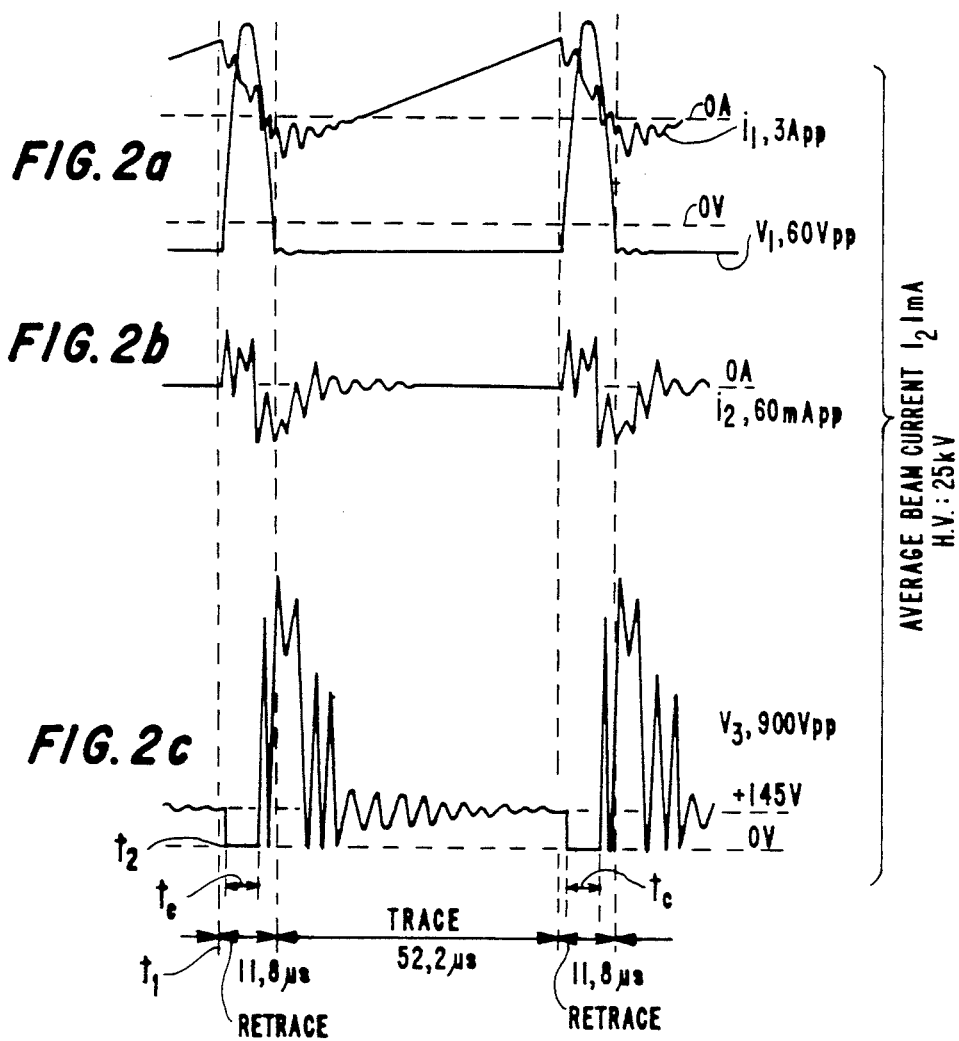

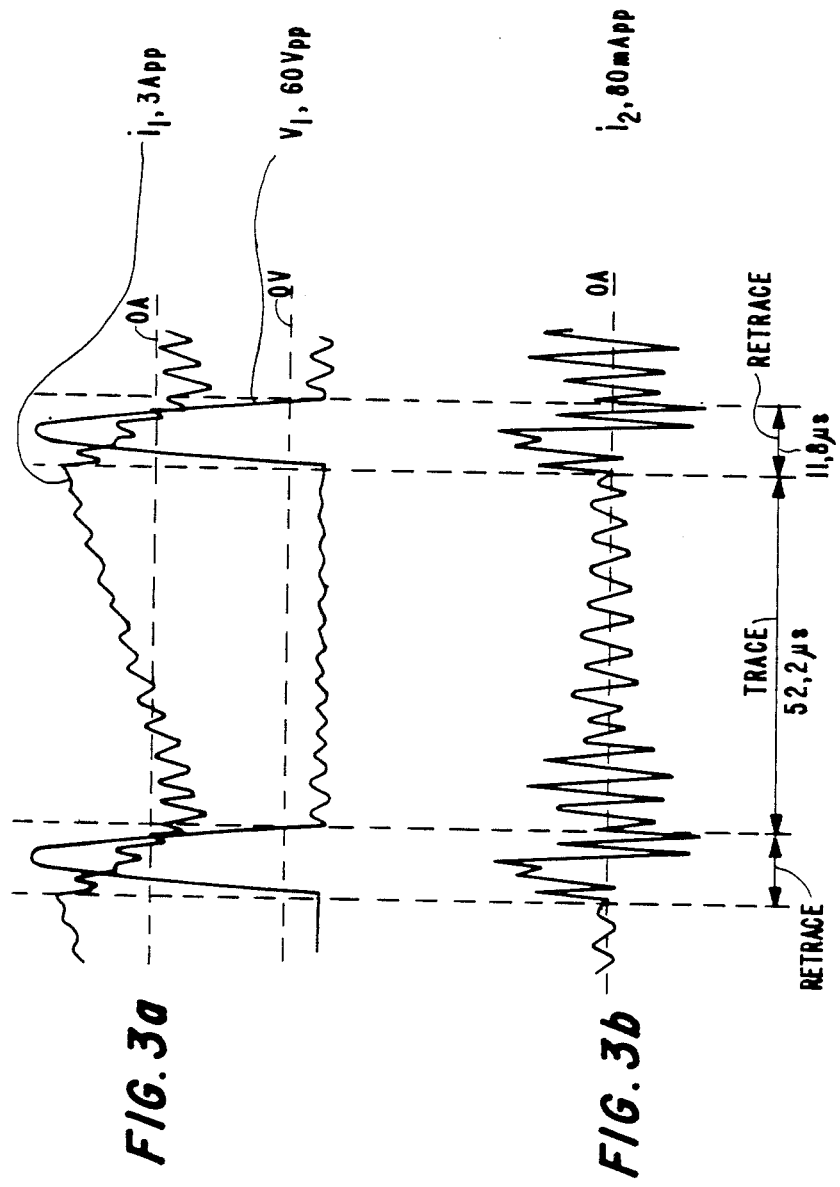

ARRANGEMENT FOR REDUCING RINGING IN A FLYBACK TRANSFORMER

The invention relates to a high voltage power supply of a television apparatus.

A conventional horizontal deflection circuit of a television receiver typically includes a flyback transformer. A high voltage such as, for example, an ultor voltage may be generated from a retrace pulse voltage in the flyback transformer using a "diode split" arrangement. In such arrangement, a segmented, tertiary high voltage winding of the flyback transformer is coupled in series with, for example, four rectifier diodes. One end terminal of the tertiary or high voltage winding is coupled to an ultor voltage terminal of a cathode ray tube (CRT). The other end terminal of the high voltage may be coupled to a filter capacitor that is coupled in parallel with a resistor across which the average beam current is sampled. The beam current representative voltage developed across the resistor may be used for controlling, in a well known manner, the operation of a beam current limiter.

The high voltage rectifier diodes conduct during a short interval, close to the peak of the retrace pulse voltage that is developed in the high voltage winding. When the retrace pulse voltage starts sloping down, during the second half of retrace, the rectifier diodes become abruptly nonconductive, causing, disadvantageously, an oscillatory, ringing current to flow in the high voltage winding having initially a high amplitude with a gradually decreasing envelope that may continue during the trace interval.

The ringing current is generated by the energy stored in the leakage inductance between a primary winding and the tertiary winding of the flyback transformer. The leakage inductance is required for obtaining a resonance circuit that is tuned to, for example, the fifth harmonic of the horizontal deflection frequency $f_H$ in order to form a low output impedance at the ultor voltage terminal. In this way, a desirable high voltage stability versus beam current is obtained.

As indicated before, the current in the tertiary winding may, disadvantageously, continue in the form of ringing current during trace. By transformer action the parasitic ringing current appears also in the primary winding and affects voltages produced in other windings of the flyback transformer. The ringing current may, disadvantageously, disturb the deflection circuit, resulting in dark vertical bars on the left hand side of the displayed raster, particularly if an east-west raster correction circuit is employed. Ringing voltage that is produced in a secondary winding of the flyback transformer may also disturb the phasing of the horizontal oscillator resulting in distortion of a pattern of vertical raster lines. Consequently, vertical lines of, for example, a crosshatch pattern will not be perfectly straight. Such disturbance in the horizontal oscillator synchronization may occur in a deflection circuit in which a retrace voltage in the secondary winding of the flyback transformer is used for providing feedback synchronization information to the horizontal oscillator. It is, therefore, desirable to reduce the amplitude and duration of the ringing current in the tertiary, high voltage winding, during, for example, the trace interval.

In some prior art circuits, a resistor coupled in the current path of the current in the tertiary winding is used for obtaining sufficient damping action for the ringing current. The added resistor may have a rather large value in the order of 20 to 40 kOhms. The narrow retrace current pulse in the tertiary winding flows also through the added ringing damping resistor. The result is a voltage drop of between 0.8 kV and 1.5 kV at, for example, 1 mA average beam current. Disadvantageously, this prior art solution also increases significantly the output impedance at the ultor voltage terminal. Furthermore, the added resistor, disadvantageously, dissipates a high amount of power.

A power supply, embodying an aspect of the invention, of a television apparatus generates a high voltage that is applied to a load of the television apparatus. The power supply includes a source of an input signal at a first frequency and a flyback transformer having a high voltage winding. A high voltage that includes a periodic flyback pulse having a period that is related to the frequency of the input signal is generated in the high voltage winding. The high voltage is applied to the load during a flyback, first interval of the flyback pulse. The high voltage is decoupled from the load following the first interval. An impedance, coupled to the flyback transformer conducts, during a second interval of the period of flyback pulse, a ringing current that is produced in the transformer such that during the second interval the impedance dampens the ringing current. A switching arrangement, is coupled to the transformer for conducting a portion of the ringing current through the switching arrangement instead of through the impedance, that substantially reduces the dampening of the ringing current by the impedance, during at least part of the first interval of the flyback pulse.

FIGS. 2a–2c illustrate waveforms useful for explaining the operation of the power supply of FIG. 1; and FIGS. 3a–3b illustrates waveforms of a power supply without employing the ringing current damper of FIG. 1.

Figure 1:
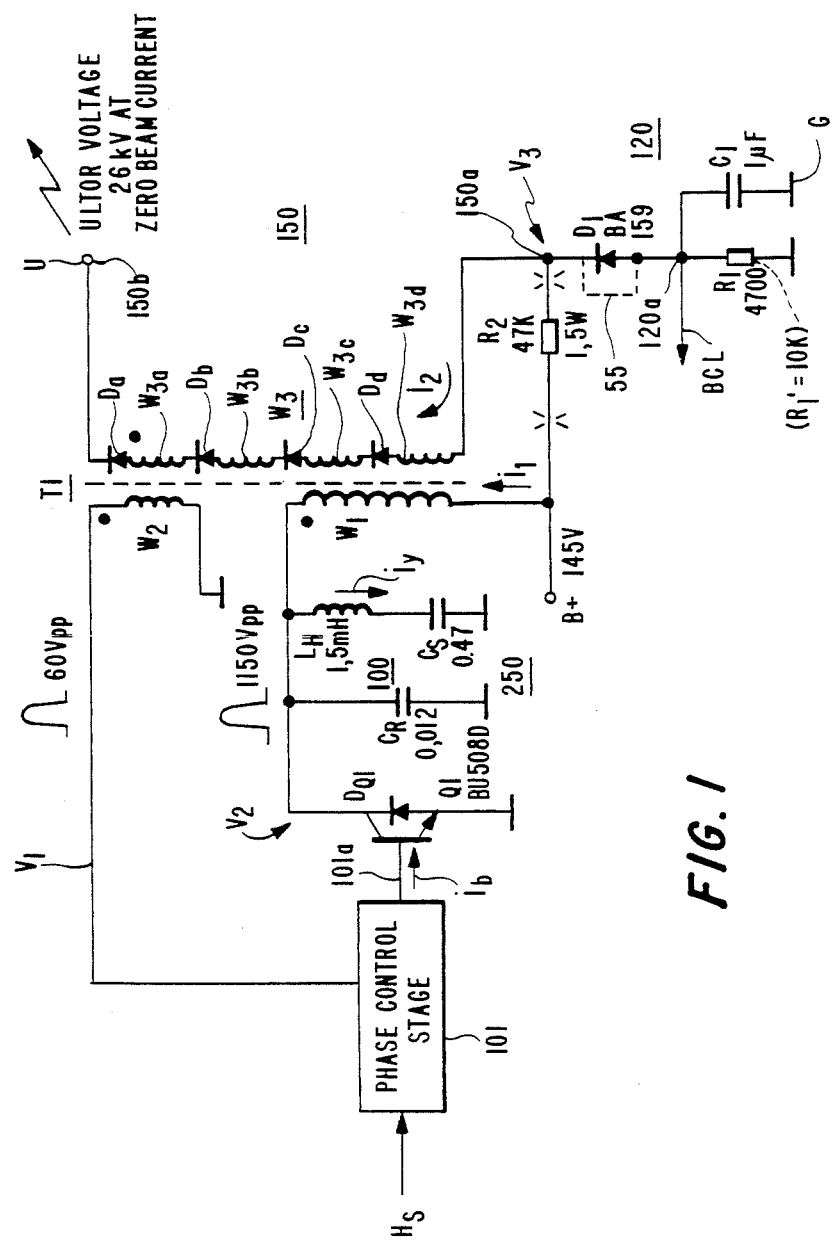
FIG. 1 illustrates a high voltage power supply including a ringing current damper, embodying an aspect of the invention.

FIG. 1 illustrates a high voltage power supply, embodying an aspect of the invention. In the power supply of FIG. 1, a horizontal deflection circuit 250 that provides horizontal deflection for a CRT, not shown, includes a switching transistor Q1 operating at a horizontal frequency $f_H$ and an anti-parallel damper diode $D_{Q1}$. A retrace capacitance $C_R$ is coupled in parallel with transistor Q1 and diode $D_{Q1}$. A deflection winding $L_H$ is coupled in series with an S-shaping trace capacitance $C_S$, forming a circuit branch that is coupled in parallel with each of transistor Q1, diode $D_{Q1}$ and retrace capacitance $C_R$ to form a retrace resonant circuit 100 during horizontal retrace.

A phase-control stage 101 that includes a horizontal oscillator and a phase detector, not shown in the FIGURES, is responsive to a horizontal synchronizing signal $H_s$. Signal $H_s$ is derived from, for example, a video detector of a television receiver, not shown in the FIGURES. Stage 101 applies a drive signal 101a to a base-emitter junction of a transistor Q1 for producing a base drive current $i_b$ at the horizontal frequency $f_H$. Current $i_b$ causes the switching operation in transistor Q1 to occur that causes a deflection current $i_y$ to flow in winding $L_H$. A primary winding $W_1$ of a flyback transformer T1 is coupled between a source of a B+ supply voltage and the collector of transistor Q1. A secondary winding $W_2$ of transformer T1 is coupled to stage 101 to provide a feedback retrace signal $V_1$ produced by the switching operation of transistor Q1. Stage 101 generates drive signal 101a, causing horizontal deflection current $i_y$ to be exactly phased to signal $H_s$.

A retrace voltage $V_2$ generated at a junction terminal between primary winding $W_1$ of transformer T1 and the collector of transistor Q1 is magnetically coupled to winding segments $W_{3a}$, $W_{3c}$ and $W_{3d}$ of a segmented tertiary, high voltage winding $W_3$ of transformer T1. The retrace pulse voltages in winding segments $W_{3a}$–$W_{3d}$ are rectified using rectifying diodes $D_a$–$D_d$. Diodes $D_a$–$D_d$ and winding segments $W_{3a}$–$W_{3d}$ that are alternately coupled in series, form a diode split arrangement 150 having an end terminal 150b at which ultor voltage U is developed. The other end terminal, a terminal 150a, is coupled to a cathode of a diode $D_1$ of a current ringing damping arrangement 120, embodying an aspect of the invention. The anode of diode $D_1$ is coupled to a terminal 120a of a beam current sampling resistor $R_1$, coupled in parallel with a filter capacitor $C_1$. The other terminals of resistor $R_1$ and of capacitor $C_1$ are coupled to a common ground potential G.

Diode $D_1$ is conductive close to the peak of the retrace voltage developed in winding $W_3$. Diode $D_1$ is poled in the same direction as diodes $D_a$–$D_d$. A beam current indicative voltage BCL at a low level is developed at terminal 120a and applied to a conventional beam current limiter, not shown. Current ringing damping arrangement 120 includes a damping resistor $R_2$ coupled to receive the B+ supply voltage of, illustratively, +145V and to apply the B+ supply voltage to terminal 150a of Diode $D_1$.

FIGS. 2a–2c illustrates waveforms useful in explaining the operation of the high voltage power supply of FIG. 1. Similar numbers and symbols in FIGS. 1 and in 2a–2c indicate similar items or functions.

At the beginning of each retrace interval, designated as time $t_1$ in FIGS. 2a–2c, transistor Q1 of FIG. 1 becomes nonconductive, causing a retrace voltage $V_2$ to develop across primary winding $W_1$ of flyback transformer T1 and a retrace voltage $V_1$ to develop across winding $W_2$. The waveform of retrace voltage $V_2$ is similar in shape to that of voltage $V_1$ of FIG. 2a. The peak-to-peak amplitude of voltage $V_2$ is approximately 1150V and that of voltage $V_1$, 60V. Similarly, corresponding retrace voltages are developed across each winding segments $W_{3a}$–$W_{3d}$ of tertiary winding $W_3$.

Throughout trace, and at time $t_1$ of FIGS. 2a–2c, the beginning of retrace, diode $D_1$ of FIG. 1 is back biased by the +145V that is applied via resistor $R_2$ to the cathode of diode $D_1$. As a result, a voltage $V_3$ at terminal 150a has an average value that is equal to +145V during trace and at the beginning time, $t_1$, of retrace of FIG. 2c.

As the level of the retrace voltage at winding segment $W_{3d}$ increases, during the first half of retrace, a current $i_2$, flowing in winding $W_3$, increases. Current $i_2$ that also flows through resistor $R_2$ causes voltage $V_3$ to decrease until diode $D_1$ becomes forward biased and clamps voltage $V_3$ to approximately zero volts, as shown at time $t_2$ in FIG. 2c. The further increasing current $i_2$ of FIG. 2b in winding $W_3$ of FIG. 1 flows mainly through forward biased diode $D_1$ and bypasses resistor $R_2$, during interval $t_c$ of FIG. 2c. Therefore, advantageously, resister $R_2$ does not increase the output impedance at ultor terminal 150b during interval $t_c$ of FIG. 2c. During interval $t_c$, current $i_2$ of FIG. 1 charges the ultor capacitance formed by the CRT, not shown.

During interval $t_c$ of FIG. 2c, current $i_2$ of FIG. 2b is not dampened since conductive diode $D_1$ of FIG. 1 bypasses resistor $R_2$ When diode $D_1$ is conductive, the impedance developed across resistor $R_2$ is formed by the series arrangement of the "ON" resistance of diode $D_1$ and the impedance of capacitor $C_1$ that is low at the horizontal frequency $f_H$ and at it harmonics. Consequently, during interval $t_c$ of FIG. 2c, current $i_2$ of FIG. 2b is an undampened oscillatory current. Current $i_2$ oscillates at the fifth harmonic of the fundamental frequency $f_H$ of voltage $V_1$ of FIG. 2a. The oscillation frequency is determined in accordance with the resonance frequency to which a resonance circuit that includes the leakage inductance of transformer T1 is tuned. The result is that the output impedance at ultor terminal 150b is, advantageously, low that provides better ultor voltage regulation as a function of beam current than if resistor $R_2$ were not bypassed.

During interval $t_c$ of FIG. 2c, voltage $V_3$ is clamped to the small, negative level of voltage BCL developed across capacitor $C_1$ of FIG. 1. As indicated before, voltage BCL is used by a beam current limiter, not shown, for limiting excessive beam current in the CRT. Thus, advantageously, damping arrangement 120 can be used together with the beam current sampling resistor $R_1$. At the end of interval $t_c$ of FIG. 2c, diodes $D_a$, $D_b$, $D_c$ and $D_d$ become nonconductive and ringing current $i_2$ of FIG. 2b produces a high amplitude of ringing in voltage $V_3$ of FIG. 2c, developed across damping resistor $R_2$ of FIG. 1.

During the second part of retrace that follows interval $t_c$, current $i_2$ of FIG. 2b and the B+ supply voltage cause diode $D_1$ of FIG. 1 to be back biased. Therefore, during the second part of retrace and also during trace, diode $D_1$ is back biased, causing current $i_2$ to flow mainly through damping resistor $R_2$ that is coupled in series with winding $W_3$. Consequently, in accordance with an aspect of the invention, energy dissipating resistor $R_2$ dampens current ringing in current $i_2$ of FIG. 2b. The result is that the potentially ill effects of such current ringing, as explained before, are substantially reduced.

FIGS. 3a and 3b illustrate waveforms of a modified arrangement of FIG. 1 in which resistor $R_2$ of FIG. 1 is removed, in which a larger resistor of 10 kΩ is substituted for resistor $R_1$ of FIG. 1 having a value of 4.7 kΩ and in which diode $D_1$ of FIG. 1 is replaced by a jumper wire 55, all as shown by dash lines in FIG. 1. Such modified arrangement does not include damping arrangement 120 of the invention. Similar numbers and symbols in FIGS. 2a–2c and in FIGS. 3a–3b indicate similar items or functions.

In order to obtain a predetermined level of voltage BCL at a corresponding level of current $i_2$ that are, each, the same in both the modified and the unmodified arrangement of FIG. 1, the value of resistor $R_1$, in the unmodified arrangement, is smaller. This is so because of the higher DC voltage level developed in resistor $R_1$ as a result of the rectification caused by diode $D_1$ in the unmodified arrangement.

By comparing FIGS. 3b and 2b, for example, it can be seen that the amplitude of the ringing current portion of current $i_2$ of FIG. 1 during trace is, advantageously, significantly lower when damping arrangement 120 is included in the high voltage power supply.

What is claimed is:

1. A power supply of a television apparatus for generating a high voltage that is applied to a load of said television apparatus, comprising;
   a source of an input signal at a first frequency;
   a flyback transformer having a high voltage winding;
   means responsive to said input signal and coupled to said flyback transformer for generating in said high voltage winding said high voltage that includes a periodic flyback pulse having a period that is related to said frequency of said input signal;
   means for applying said high voltage to said load during a flyback, first interval of said period of said flyback pulse and for decoupling said high voltage from said load following said first interval;
   an impedance coupled to said flyback transformer for conducting, during a second interval of said period of said flyback pulse, a ringing current that is produced in said transformer such that during said second interval said impedance dampens said ringing current; and
   switching means coupled to said transformer for conducting a portion of said ringing current through said switching means instead of through said impedance to substantially reduce the dampening of said ringing current by said impedance during at least part of said first interval of said flyback pulse.

2. A power supply according to claim 1 wherein said impedance comprises a resistance that is coupled in series with said high voltage winding and wherein said switching means is coupled to said resistance in a manner that bypasses said resistance during said first interval of said flyback pulse.

3. A power supply according to claim 1 wherein said switching means comprises a rectifier that is conductive during said first interval of said flyback pulse and that is nonconductive substantially outside said first interval of said flyback pulse.

4. A power supply according to claim 3 wherein said impedance is coupled between a source of a supply voltage and an electrode of said rectifier that back biases said rectifier to prevent conduction in said rectifier as long as said flyback pulse is at a level determined in accordance with said supply voltage and said impedance, that is smaller than a predetermined level.

5. A power supply according to claim 3 further comprising, a beam current sampling resistance coupled in series with said rectifier and with said high voltage winding.

6. A power supply according to claim 3 wherein said rectifier is coupled to a first terminal of said high voltage winding and wherein a second rectifier is coupled to a second terminal of said high voltage winding that is remote from said first terminal to produce an ultor voltage at an output terminal.

7. A power supply according to claim 1 wherein said high voltage generating means comprise a retrace resonant circuit of a horizontal deflection circuit coupled to said transformer and second switching means responsive to said input signal at a horizontal deflection frequency and coupled to said transformer for generating in said transformer said flyback pulse forming a retrace pulse that is repetitive at a horizontal frequency.

8. A power supply according to claim 1 wherein a leakage inductance of said flyback transformer causes said ringing current to be generated and wherein ringing current flows in said high voltage winding.

9. A high voltage power supply of a television apparatus, comprising;
   a flyback transformer having a high voltage winding and including a leakage inductance;
   an ultor voltage receiving terminal coupled to said high voltage winding;
   a source of an input signal at a horizontal frequency;
   first switching means responsive to said input signal and coupled to said flyback transformer for generating a pulse voltage at a high amplitude that is coupled to said ultor voltage receiving terminal and that produces a ringing current in accordance with said leakage inductance of said transformer;
   a resistance coupled in series with said high voltage winding for conducting at least a portion of said ringing current; and
   second switching means coupled to said resistance for conducting a substantially larger portion of said ringing current therein than in said resistance during a second interval of said retrace pulse voltage such that when conductive, said second switching means bypasses said resistance.

10. An apparatus according to claim 9 wherein said second switching means comprises a diode responsive to said retrace pulse voltage and coupled to a second terminal of said high voltage winding for applying, when said diode is conductive, a second impedance whose value is substantially smaller than said resistance to said second terminal of said high voltage winding that bypasses said resistance 11. An apparatus according to claim 10 further comprising, a source of a first voltage that is applied to said diode to back bias said diode that renders said diode nonconductive when an amplitude of a retrace voltage developed at said second terminal is smaller than a predetermined value.

12. An apparatus according to claim 11 wherein said first voltage is coupled to said diode via said first resistance.

13. An apparatus according to claim 9 wherein said second switching means prevents said resistance from increasing an output impedance at said ultor voltage receiving terminal when said second means is conductive and that dampens said ringing current when said second means is nonconductive.

14. An apparatus according to claim 9 further comprising, a plurality of diodes coupled to said high voltage winding to form a diode split arrangement that rectifies said retrace pulse voltage to produce said ultor voltage.

15. An apparatus according to claim 9 wherein said second switching means is nonconductive substantially outside a retrace interval to prevent bypassing of said resistance, substantially, throughout trace.

16. A power supply of a television apparatus for generating a high voltage that is applied to a load of said television apparatus, comprising:
    a source of an input signal at a first frequency;
    a flyback transformer having a high voltage winding;
    means responsive to said input signal and coupled to said flyback transformer for generating in said high voltage winding said high voltage that includes a periodic flyback pulse having a period that is related to said frequency of said input signal;
    means for applying said high voltage to said load during an interval of said period of said flyback pulse and for decoupling said high voltage from said load following said first interval;
    means coupled to said flyback transformer for dampening, outside said interval, a ringing current that is produced in said transformer when said high voltage is decoupled from said load; and
    means coupled to said dampening means for substantially reducing the dampening of said ringing current by said dampening means during at least part of said first interval of said flyback pulse.

* * * * *